United States Patent
Nicholls et al.

(10) Patent No.: US 9,171,567 B1
(45) Date of Patent: Oct. 27, 2015

(54) DATA STORAGE DEVICE EMPLOYING SLIDING MODE CONTROL OF SPINDLE MOTOR

(71) Applicant: Western Digital Technologies, Inc., Irvine, CA (US)

(72) Inventors: Michael T. Nicholls, Laguna Hills, CA (US); Taylor Norito Kelena Watanabe, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/287,511

(22) Filed: May 27, 2014

(51) Int. Cl.
G11B 15/46 (2006.01)
G11B 19/28 (2006.01)
G11B 19/24 (2006.01)

(52) U.S. Cl.
CPC ............... *G11B 19/28* (2013.01); *G11B 19/24* (2013.01)

(58) Field of Classification Search
None
See application file for complete search history.

(56) References Cited

U.S. PATENT DOCUMENTS

| | | | |
|---|---|---|---|
| 5,365,385 A | 11/1994 | Hargarten et al. | |
| 5,473,230 A * | 12/1995 | Dunn et al. | 318/432 |
| 5,847,895 A | 12/1998 | Romano et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |

(Continued)

FOREIGN PATENT DOCUMENTS

WO 2004057583 A3 8/2004

OTHER PUBLICATIONS

A. Kechich, B. Mazari, I. K. Bousserhane, "Application of Nonlinear Sliding-Mode Control to Permanent Magnet Synchronous Machine," International Journal of Applied Engineering Research, ISSN 0973-4562 vol. 2, No. 1 (Apr. 2007), pp. 125-138.

(Continued)

*Primary Examiner* — Andrew L Sniezek

(57) ABSTRACT

A data storage device is disclosed comprising a head actuated over a disk, and a spindle motor configured to rotate the disk. A speed of the spindle motor is sampled, and an error signal is generated based on a difference between the sampled speed and a target speed. A sliding mode control signal for controlling a speed of the spindle motor is generated based on a first non-zero gain when the error signal is greater than zero and less than a first positive threshold, and a second non-zero gain when the error signal is greater than the first positive threshold.

6 Claims, 4 Drawing Sheets

(56) References Cited

U.S. PATENT DOCUMENTS

| | | |
|---|---|---|
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,744,587 B2 * | 6/2004 | Ang et al. .............. 360/69 |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,463 B2 | 11/2005 | Sri-Jayantha et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,019,482 B2 | 3/2006 | Yoneda |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,256,564 B2 | 8/2007 | MacKay |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,432,673 B2 * | 10/2008 | Oh et al. .............. 318/66 |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |

(56) References Cited

U.S. PATENT DOCUMENTS

| | | |
|---|---|---|
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,990,089 B1 | 8/2011 | Ying et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,094,405 B1 | 1/2012 | Ying et al. |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2003/0184249 A1 | 10/2003 | Heydt et al. |
| 2010/0035085 A1 | 2/2010 | Jung et al. |
| 2012/0224464 A1 | 9/2012 | Kim |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

US 7,205,739, 04/2007, MacKay (withdrawn)

* cited by examiner

DATA STORAGE DEVICE EMPLOYING SLIDING MODE CONTROL OF SPINDLE MOTOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A spindle motor rotates the disk (or disks) at a high speed so that the head essentially flies over the disk surface on an air bearing. When accessing the disk during write/read operations, it is typically important for the spindle motor to maintain the disk at a target rotation speed so as to maintain a target data rate when writing data to the disk and reading data from the disk. Certain disturbances affecting the spindle motor may cause the rotation speed to deviate significantly from the target rotation speed. For example, tilting the disk drive may cause a large underspeed disturbance due to a gyroscopic effect. A linear controller, such as a proportional/integral or PI controller, may be unable to sufficiently compensate for these large disturbances and may even become unstable due to the controller saturating the digital-to-analog converter (DAC) that generates the control signal (e.g., current) applied to the spindle motor.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
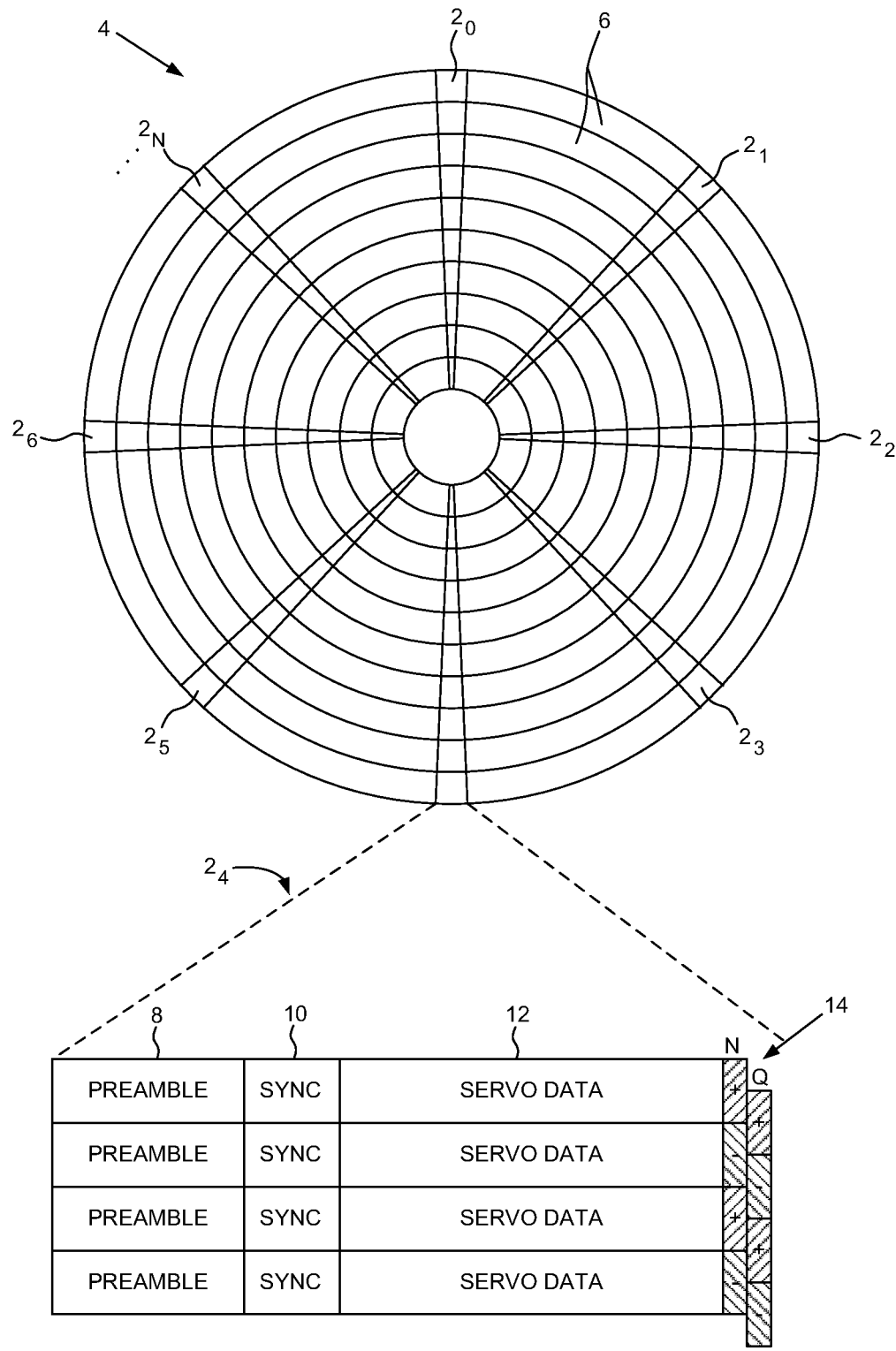
FIG. 1 shows a prior art disk format comprising a plurality of servo tracks defined by servo sectors.
Figure 2A:
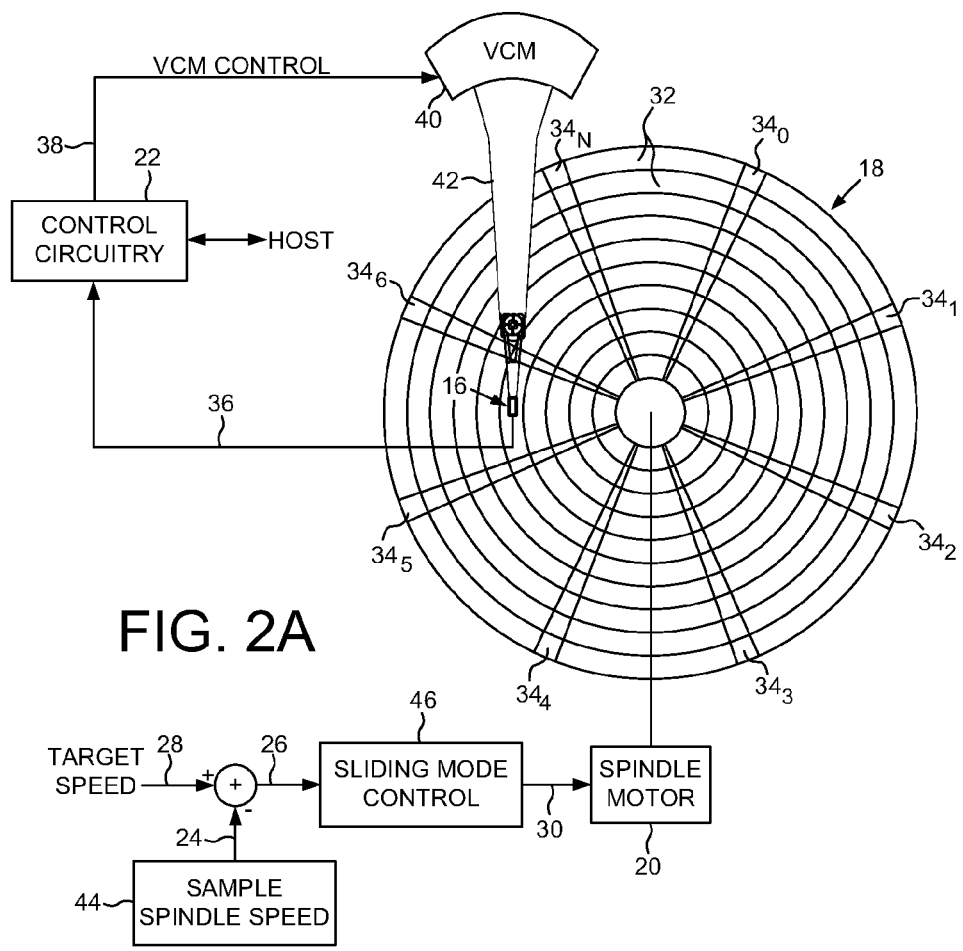
FIG. 2A shows a data storage device in the form of a disk drive according to an embodiment comprising a head actuated over a disk that is rotated by a spindle motor.

FIG. 2A shows a data storage device in the form of a disk drive according to an embodiment comprising a head 16 actuated over a disk 18, and a spindle motor 20 configured to rotate the disk 18. The disk drive further comprises control circuitry 22 operable to sample a speed 24 of the spindle motor, and generate an error signal 26 based on a difference between the sampled speed 24 and a target speed 28. A sliding mode control signal 30 for controlling a speed of the spindle motor 20 is generated based on a first non-zero gain G1 (e.g., FIG. 2B) when the error signal 26 is greater than zero and less than a first positive threshold +Th1, and a second non-zero gain G2 when the error signal 26 is greater than the first positive threshold +Th1.

In the embodiment of FIG. 2A, the disk 18 comprises a plurality of servo tracks 32 defined by servo sectors $34_0$-$34_N$, wherein data tracks are defined relative to the servo tracks at the same or different radial density. The control circuitry 22 processes a read signal 36 emanating from the head 16 to demodulate the servo sectors $34_0$-$34_N$ and generate a position error signal (PES) representing an error between the actual position of the head and a target position relative to a target track. The control circuitry 22 filters the PES using a suitable compensation filter to generate a control signal 38 applied to a voice coil motor (VCM) 40 which rotates an actuator arm 42 about a pivot in order to actuate the head 16 radially over the disk 18 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

Block 44 of FIG. 2A may sample the speed 24 of the spindle motor 20 in any suitable manner. In one embodiment, the speed of the spindle motor 20 may be sampled by evaluating the back electromotive force (BEMF) voltage in each winding of the spindle motor 20. The spindle motor 20 typically operates according to a plurality of electrical cycles over a single revolution, wherein the total number of electrical cycles depends on the number of pole-pairs employed in the spindle motor 20. For example, a 6-pole-pair spindle motor will generate six electrical cycles over a single revolution. In one embodiment, the speed of the spindle motor 20 may be sampled by measuring the frequency of the electrical cycles, such as by detecting when the BEMF voltage crosses a threshold (e.g., zero-crossings). In another embodiment, the speed of the spindle motor 20 may be sampled based on the frequency of the detected servo sectors $34_0$-$34_N$. For example, the frequency of the detected servo sectors $34_0$-$34_N$ may be determined by measuring the interval between consecutive servo sectors (the wedge-to-wedge time).

Figure 2B:
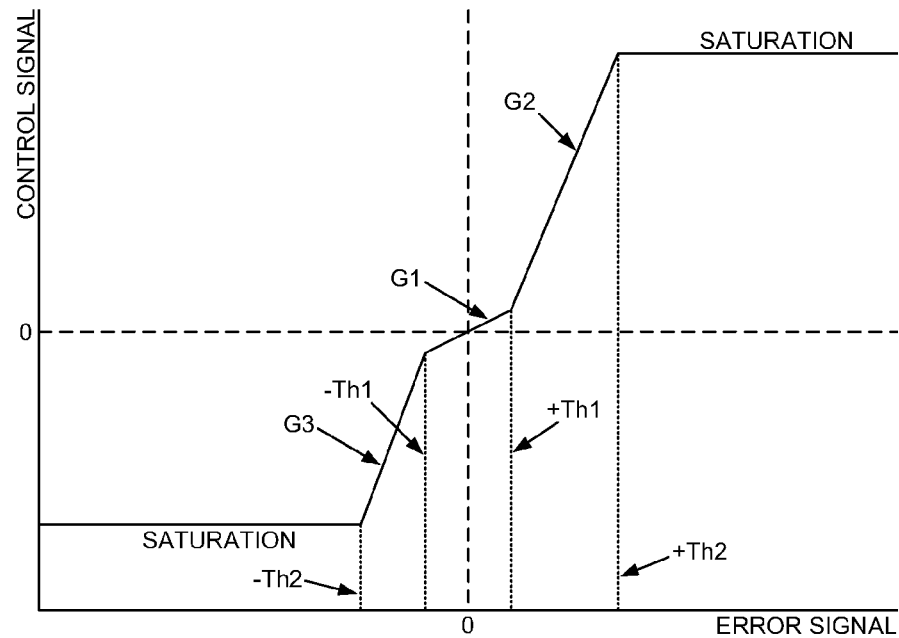
FIG. 2B shows a sliding mode control embodiment wherein a control signal for controlling a speed of the spindle motor is generated based on a first non-zero gain when the error signal is greater than zero and less than a first positive threshold, and based on a second non-zero gain when the error signal is greater than the first positive threshold.

In one embodiment, block 46 of FIG. 2A generates the sliding mode control signal 30 applied to the spindle motor 20 in order to maintain the spindle motor at the target speed 28. Referring to the embodiment of FIG. 2B, when the error signal 26 representing the error between the sampled speed 24 and the target speed 28 exceeds a first positive threshold +Th1, the sliding mode control signal 30 is generated by multiplying the error signal 26 by a gain G2. When the error signal 26 exceeds a second positive threshold +Th2, the sliding mode control signal is saturated, such as by saturating a digital-to-analog converter (DAC) used to generate the sliding mode control signal 30, or otherwise limiting the amplitude of the sliding mode control signal 30 (e.g., through firmware). When the error signal 26 is less than the first positive threshold +Th1 (but greater than zero), the sliding mode control signal 30 is generated by multiplying the error signal 26 by a gain G1 that is less than the gain G2. When the error signal 26 is negative, the sliding mode control signal 30 is similarly generated based on thresholds −Th1 and −Th2 as well as a gain G3 which may be the same or different from G2. As illustrated in the example of FIG. 2B, the sliding mode control signal 30 may be generated asymmetrically relative to the polarity of the error signal 26.

In one embodiment, employing a sliding mode control algorithm to control the speed of the spindle motor 20 provides improved disturbance compensation, such as by saturating the sliding mode control signal 30 during a large disturbance while maintaining stability of the speed control loop. In one embodiment, the gains G2 and G3 may be selected so that the sliding mode control signal 30 quickly reaches saturation in the presence of a large disturbance, thereby decreasing the response time to compensate for the disturbance without losing stability as may happen when employing a linear control algorithm, such as with a proportional-integral (PI) algorithm.

In one embodiment, it may be desirable to reduce the switching noise (chatter) caused by a sliding mode controller when the error signal 26 is near zero while still ensuring the error signal 26 is eventually driven to zero so that the spindle motor 20 maintains the target speed 28. In the embodiment of FIG. 2B, this is accomplished by changing the gain of the sliding mode control 46 from G2 or G3 to G1 when the error signal 26 falls below the threshold Th1. In this manner, when the error signal 26 is near zero (less than threshold Th1), the sliding mode control 46 may switch between a negative and positive control signal, but the amplitude of the control signal is reduced which reduces chatter. To further reduce chatter and/or other transients, in one embodiment a first slope of the sliding mode control signal defined by the non-zero gain G1 is contiguous with a second slope of the sliding mode control signal defined by the non-zero gain G2 as illustrated in FIG. 2B. In this manner, there is a smooth transition when the sliding mode control 46 switches between the gains G1 and G2 or between the gains G1 and G3.

Figure 3A:
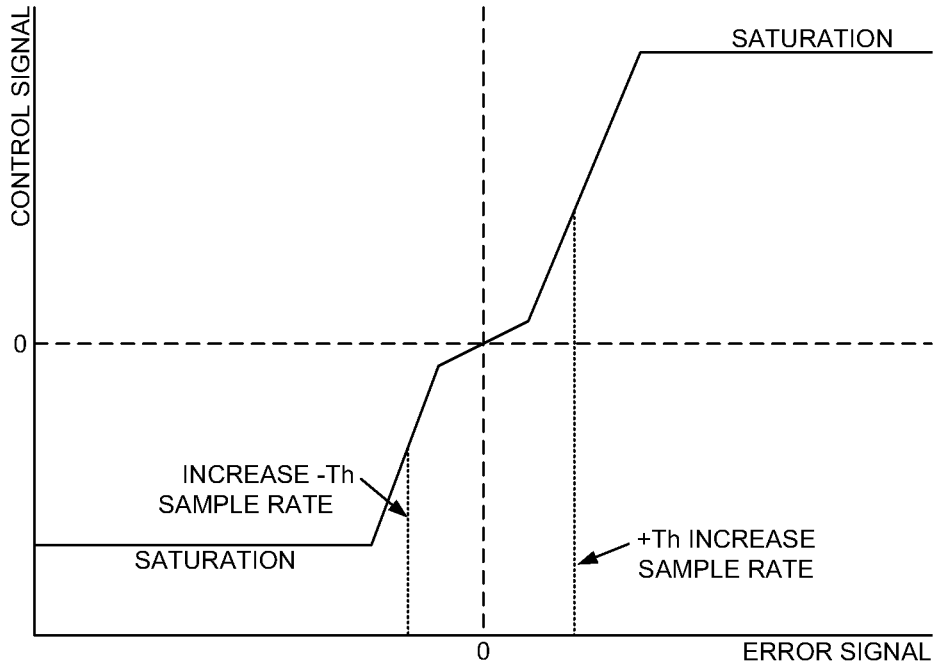
FIG. 3A shows a sliding mode control embodiment wherein a speed of the spindle motor is sampled at a sampling rate that is adjusted based on a difference between the sampled speed and a target speed.

FIG. 3A illustrates another embodiment of the present invention wherein the control circuitry 22 of FIG. 2A is configured to sample a speed of the spindle motor 20 at a sampling rate, and when the error signal 26 exceeds a threshold Th, the control circuitry 22 increases the sampling rate. In one embodiment, increasing the sampling rate of the spindle motor speed to thereby increase the sampling rate of the error signal 26 improves the performance of the sliding mode control 46 by decreasing the response time and/or decreasing chatter. The sampling rate of the spindle motor speed may be increased in any suitable manner, such as by increasing the frequency that the BEMF voltage generated by the spindle motor is evaluated. For example, in one embodiment a single zero-crossing may be detected in the BEMF voltage per revolution when the error signal 26 is less than the threshold Th, whereas multiple zero-crossings may be detected in the BEMF voltage per revolution, such as by monitoring multiple of the electrical cycles in the BEMF voltage. In an embodiment wherein the spindle motor speed is sampled based on the servo sectors $34_0$-$34_N$, the sampling period may be a rotational duration for a single servo sector to rotate a full revolution when the error signal 26 is less than the threshold Th, whereas the sampling period may be decreased by evaluating a rotational duration between at least two of the servo sectors up to the rotational duration (wedge-to-wedge time) between each servo sector.

Although in the embodiment of FIG. 3A the sampling rate of the spindle motor speed is increased based on a single threshold, other embodiments may employ multiple thresholds so that the sampling rate may be incrementally increased as the error signal 26 increases in magnitude. In other embodiments, there may be asymmetry between a positive threshold +Th and a negative threshold −Th used to adjust the sampling rate of the spindle motor speed.

In one embodiment, after increasing the sampling rate of the spindle motor speed due to the error signal 26 exceeding one of the thresholds +Th or −Th, there may be a delay in decreasing the sampling rate after the error signal 26 falls below the threshold. In another embodiment, there may be multiple thresholds for implementing hysteresis when adjusting the sampling rate. For example, there may be a first positive threshold +Th1 and a second positive threshold +Th2 greater than +Th1. The sampling rate may be increased when the error signal 26 exceeds +Th2, and then decreased when the error signal 26 falls below +Th1.

Figure 3B:
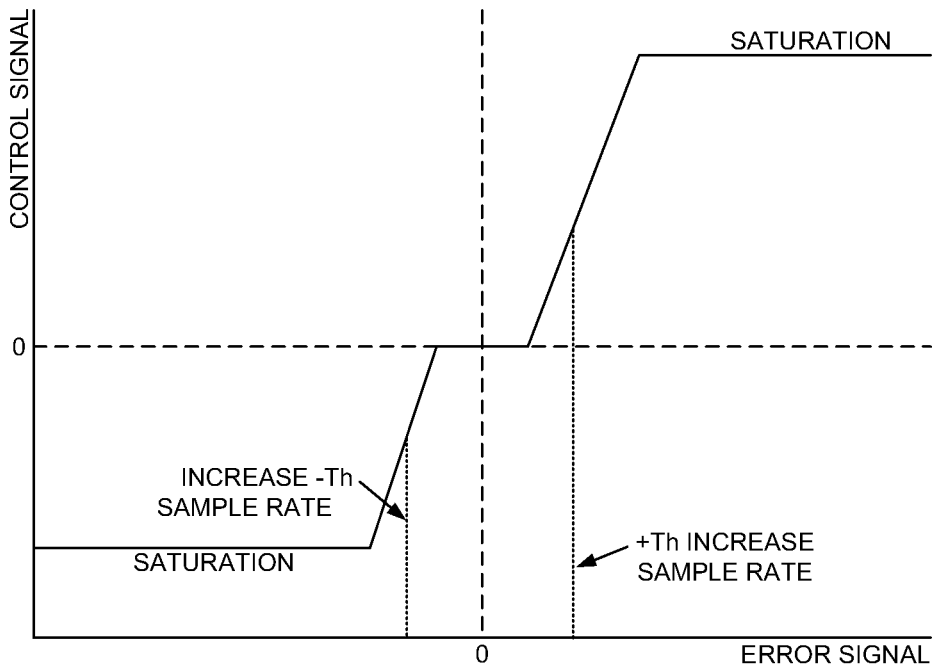
FIG. 3B shows a sliding mode control embodiment wherein the control signal for controlling the speed of the spindle motor is substantially zero when the error signal is within a dead zone.

Any suitable sliding mode control 46 may be employed in the embodiment where the sampling rate of the error signal 26 is adjusted based on the magnitude of the error signal 26. FIG. 3B shows a sliding mode control 46 comprising a dead zone wherein the sliding mode control signal 30 is disabled (zeroed) as the error signal 26 approaches zero in order to reduce chatter. That is, in one embodiment the gain G1 of FIG. 2B is zero such that the sliding mode control signal 30 is zero within the dead zone.

Figure 3C:
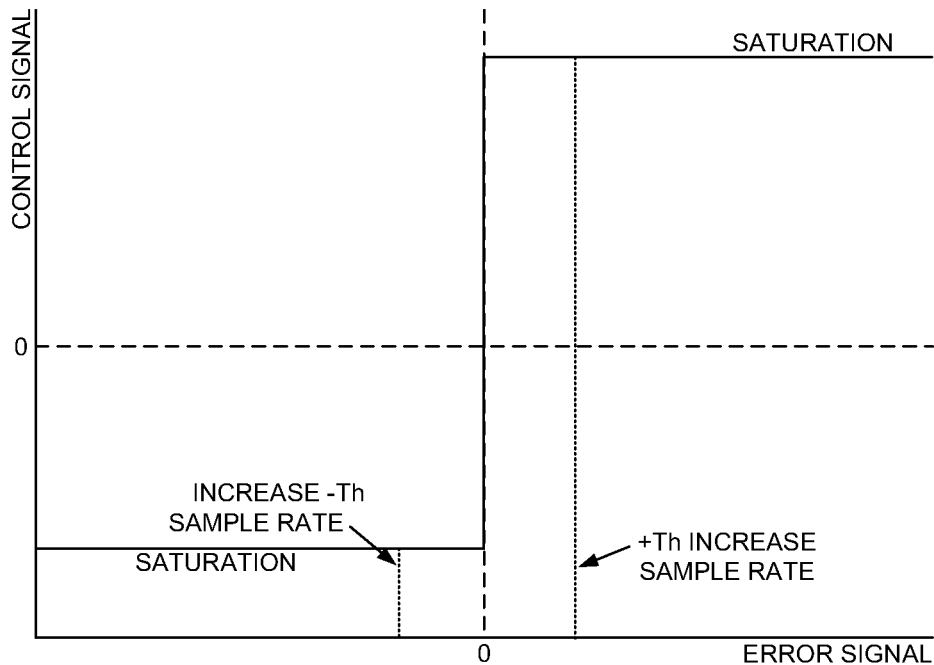
FIG. 3C shows a sliding mode control embodiment wherein the control signal for controlling the speed of the spindle motor is generated based on switching gains without a boundary layer.
Figure 3D:
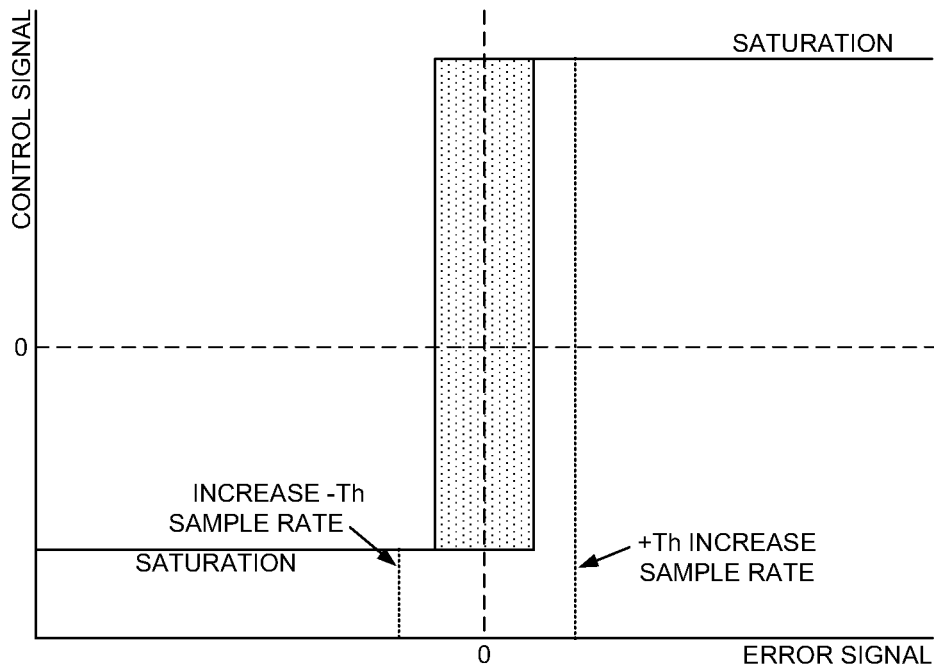
FIG. 3D shows a sliding mode control embodiment wherein the control signal for controlling the speed of the spindle motor is generated based on switching gains with a boundary layer.

FIG. 3C shows another embodiment wherein a saturated sliding mode control signal 30 is generated at a polarity corresponding to the polarity of the error signal 26. That is, the sliding mode control 46 in the embodiment of FIG. 3C may operate only in a saturation mode without transition zones defined by gains (e.g., gains G1, G2 and G3 as in FIG. 2A) and without a dead zone. FIG. 3D shows yet another embodiment of a sliding mode control 46 that employs a boundary layer defined near the zero point of the error signal 26, wherein the sliding mode control signal 30 is generated using hysteresis. That is, the polarity of the sliding mode control signal 30 may not switch until the error signal 26 exceeds the hysteresis threshold at the border of the boundary layer which may reduce chatter. Other embodiments may employ a sliding mode control 46 implementing a combination of the features illustrated in the figures. For example, the saturated sliding mode control of FIG. 3C may also implement a dead zone such as shown in the embodiment of FIG. 3B.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a head actuated over a disk;
a spindle motor configured to rotate the disk; and
control circuitry configured to:
sample a speed of the spindle motor;
generate an error signal based on a difference between the sampled speed and a target speed; and
generate a sliding mode control signal for controlling the speed of the spindle motor based on:
a first non-zero gain when the error signal is greater than zero and less than a first positive threshold; and
a second non-zero gain when the error signal is greater than the first positive threshold,
wherein a first slope of the sliding mode control signal defined by the first non-zero gain is contiguous with a second slope of the sliding mode control signal defined by the second non-zero gain.

2. The data storage device as recited in claim 1, wherein the first non-zero gain is less than the second non-zero gain.

3. The data storage device as recited in claim 1, wherein the control circuitry is further configured to saturate the sliding mode control signal when the error signal is greater than a second positive threshold higher than the first positive threshold.

4. A method of operating a disk drive, the method comprising:
sampling a speed of a spindle motor;
generating an error signal based on a difference between the sampled speed and a target speed; and
generating a sliding mode control signal for controlling the speed of the spindle motor based on:
a first non-zero gain when the error signal is greater than zero and less than a first positive threshold; and
a second non-zero gain when the error signal is greater than the first positive threshold,
wherein a first slope of the sliding mode control signal defined by the first non-zero gain is contiguous with a second slope of the sliding mode control signal defined by the second non-zero gain.

5. The method as recited in claim 4, wherein the first non-zero gain is less than the second non-zero gain.

6. The method as recited in claim 4, further comprising saturating the sliding mode control signal when the error signal is greater than a second positive threshold higher than the first positive threshold.

* * * * *